(12) United States Patent
Hsu (10) Patent No.: US 8,584,697 B2
(45) Date of Patent: Nov. 19, 2013

(54) FAUCET STRUCTURE

(75) Inventor: Ming-Yuan Hsu, Changhua (TW)

(73) Assignee: Da Yuan Sheng Industrial Co. Ltd., Changhua (TW)

( * ) Notice: Subject to any disclaimer, the term of this patent is extended or adjusted under 35 U.S.C. 154(b) by 118 days.

(21) Appl. No.: 13/364,704

(22) Filed: Feb. 2, 2012

(65) Prior Publication Data

US 2013/0199645 A1 Aug. 8, 2013

(51) Int. Cl.
*F16K 5/00* (2006.01)
*F16K 11/078* (2006.01)
*F16K 11/087* (2006.01)
*E03C 1/04* (2006.01)
*B05B 7/02* (2006.01)

(52) U.S. Cl.
USPC ............... 137/315.12; 137/801; 137/625.4; 137/625.41; 4/677; 239/525

(58) Field of Classification Search
USPC ............... 137/315.12, 625.41, 625.4, 801; 4/675–678, 695; 239/525, 600
See application file for complete search history.

(56) References Cited

U.S. PATENT DOCUMENTS 5,575,424 A * 11/1996 Fleischmann ............... 239/436
5,822,811 A * 10/1998 Ko ............................... 4/678

* cited by examiner

*Primary Examiner* — John K Fristoe, Jr.
*Assistant Examiner* — Kevin Barss
(74) *Attorney, Agent, or Firm* — Che-Yang Chen; Law Office of Michael Chen (57) ABSTRACT

An easy-to-install faucet structure includes an inner tube, a main body, a water control unit and a water outlet head. The inner tube is disposed in a through space of the main body, and has a tube base that has a plurality of rib units at an inner periphery thereof. A plurality of guiding slots are formed between each rib unit, so that when water inner tubes and a water outlet of the water control unit pass through the inner tube, they can be guided to directly pass through a second path of the connecting portion without further bundling to achieve the goal of easy tube connection and installation to simplify the assembly process.

5 Claims, 14 Drawing Sheets

FAUCET STRUCTURE

FIELD OF THE INVENTION

The present invention relates to an easy-to-install faucet structure, and more specifically to a connecting portion extending from a tube base of an inner tube, and guiding slots formed at an inner periphery of the tube base of the inner tube, so that water inner tubes and water outlet tube can be guided through the guiding slots directly to a second path of the connecting portion when passing through the inner tube without restricting the tube body to achieve the goal of tube connection and simplify installation process.

BACKGROUND OF THE INVENTION

Figure 13:
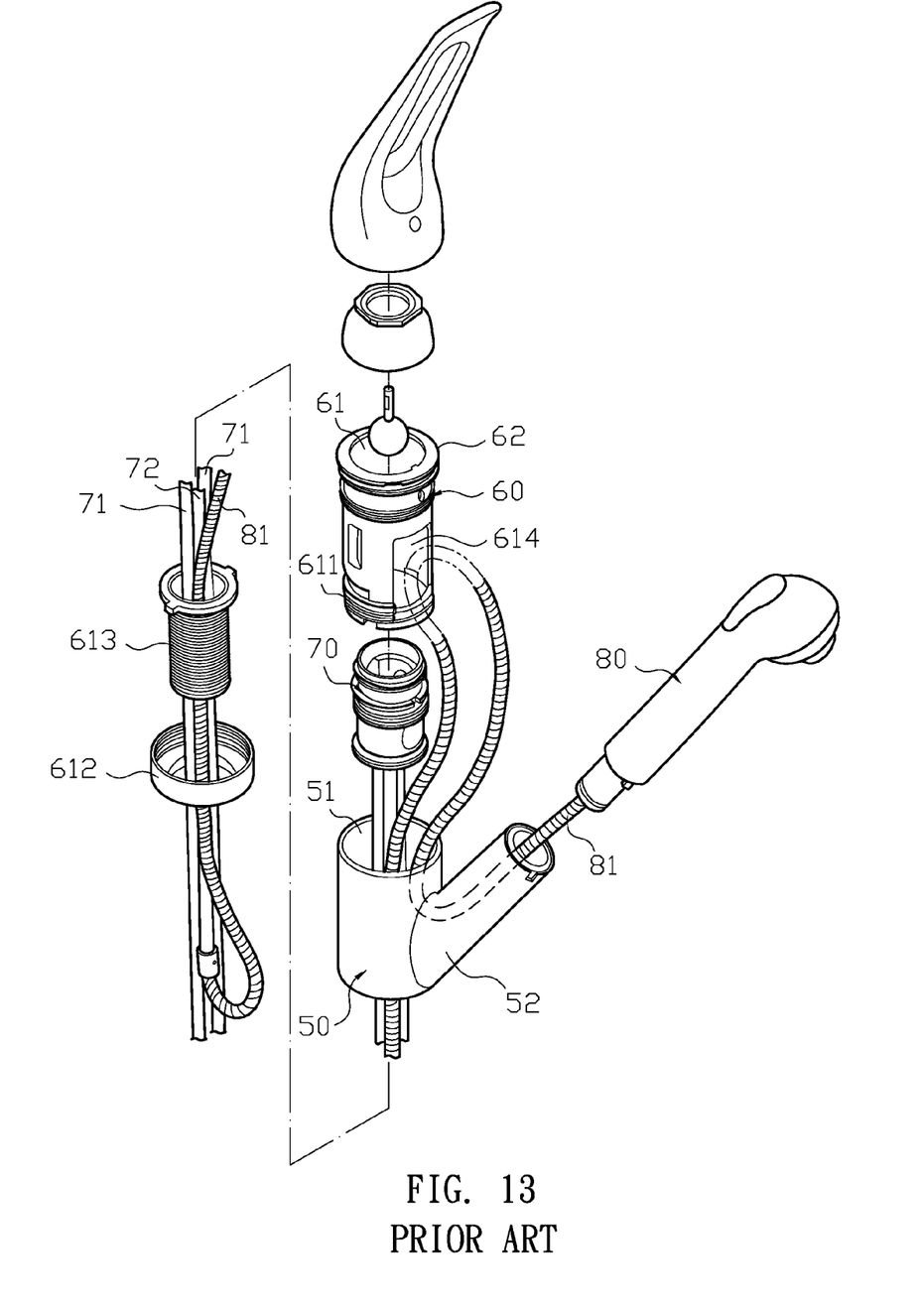
FIG. 13 illustrates a three-dimensional exploded view of prior arts.
Figure 14:
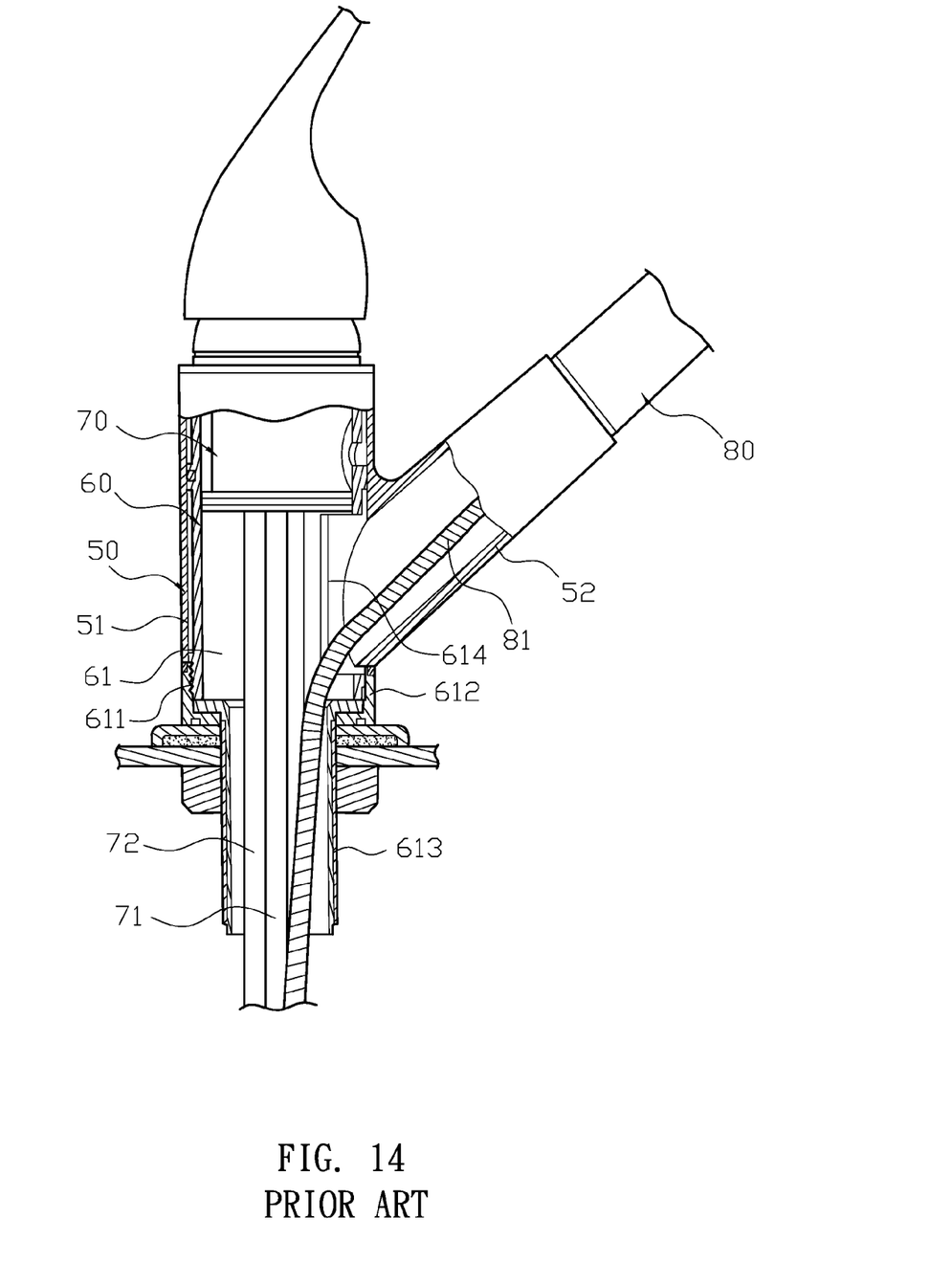
FIG. 14 illustrates a sectional schematic view of prior arts.

A conventional faucet, as shown in FIGS. 13 and 14, includes a faucet body (50), an inner cylinder (60), a valve base (70) and a water output head (80). The faucet body (50) is tubular with a space (51), and a branch tube (52) is formed on sideway thereof. The inner cylinder (60) is disposed in the space (51) of the faucet body (50), and the inner cylinder (60) is hollow with a receiving space (61). The receiving space (61) has a locking thread (611) at an opening edge to connect a connecting tube (613) through a locking ring (612), and the connecting tube (613) is used to plug into a surface of a washbasin. A sectional opening (614) is formed at sideway of the receiving space (61), and a stopping edge (62) is protrudingly formed at an upper portion of the receiving space (61), and the stopping edge (62) is against an upper opening of the faucet body (50) to form a stopping positioning. The valve base (70) is disposed at the receiving space (61) of the inner cylinder (60), and a plurality of water inlet tubes (71) and water outlet tubes (72) are connected at a lower portion of the valve base (70). The water output head (80) plugs into the branch tube (52) of the faucet body (50), and an extended tube (81) is disposed at a rear end of the water output head (80). The extended tube (81) passes through the branch tube (52), receiving space (61) and connecting tube (613) to connect with the water outlet tubes (72) underneath the surface. Also, a predetermined length is preserved so that the user can pull out the water output head (80) and the extended tube (81) to achieve the goal of adjusting water output distance of the faucet.

The conventional faucet is disadvantageous for the following reasons: (a) after connecting the water inlet tubes (71) and water outlet tubes (72) to the valve base (70), the user has to bundle the water inlet tubes (71) and water outlet tubes (72) to pass through the space (51) of the faucet body (50), the receiving space (61) of the inner cylinder (60), the connecting tube (613) and the surface. The assembly process is tedious and inconvenient; and (b) when the user pulls out the water output head (80), the extended tube (81) will interfere with nearby water inlet tubes (71) to adversely affect the smoothness of pulling out the extended tube (81). Also, the water inner tubes (71) may become loosened to result leakage, and even fall apart.

SUMMARY OF THE INVENTION

The problem to be solved in the present invention is (a) after connecting the water inlet tubes and water outlet tubes to the valve base, the user has to bundle the water inlet tubes and water outlet tubes to pass through the space of the faucet body, the receiving space of the inner cylinder, the connecting tube and the surface. The assembly process is tedious and inconvenient; and (b) when the user pulls out the water output head, the extended tube will interfere with nearby water inlet tubes to adversely affect the smoothness of pulling out the extended tube. Also, the water inner tubes may become loosened to result leakage, and even fall apart.

To solve the problems illustrated above, the present invention provides a faucet structure including an inner tube, a main body, a water control unit and a water outlet head. The inner tube has a tube base that has a stopping edge at an outer periphery, and a plurality of ribs are formed at an inner periphery of the tube base. A connecting edge is formed at an upper end of each rib, and a plurality of guiding slots are formed between each rib. An opening is formed at a front side of the tube base, and a receiving tube and a connecting portion extend from both sides of the tube base. A locking thread is formed at an opening edge of the receiving tube, and a partition board is formed at an inner periphery of the connecting portion, and the partition board can be divided into a first path and a second path. The main body is tubular with a through space disposed outside an outer periphery of the tube base of the inner tube. A plurality of rib units are formed at an inner periphery of the through space, and a lower portion of the rib unit has a stopping end used to be against the stopping edge of the inner tube to form a stopping positioning. A branch that is connected with the through space extends from the side of the main body. The water control unit includes a water control valve and a fixed base, and the water control valve is disposed into the receiving tube of the inner tube. Three flow openings and two positioning posts are protrudingly formed at a lower portion of the water control valve, and a valve stick is protrudingly formed at an upper portion of the water control valve. A restricting ring is formed at an outer periphery of the valve stick, and the restricting ring is locked through the locking thread of the inner tube. A connecting section extends upward from the restricting ring, and the connecting section is provided for an outer cover to connect and lock, so as to cover the outer periphery of the receiving tube of the inner tube. Also, the opening of the outer cover is used to be against an upper opening of the main body, and the fixed base is disposed into the receiving tube of the inner tube, and the bottom of the fixed base is against the connecting edge of the receiving tube to form a stopping positioning. The fixed base is provided for the water control valve to stack on, and two positioning holes are recessedly formed at an upper portion thereof. The fixed base also has three through holes connecting to a lower surface thereof, and the through holes are provided for the positioning posts of the water control valve to plug in, and the through holes are aligned with the flow openings of the water control valve. Two water inner tubes and one water outlet tube are connected to each through hole, and pass through the second path of the inner tube. The water outlet head plugs into the branch of the main body, and an extension tube extends from a rear end of the water output head. One end of the extension tube passes the branch, opening of the inner tube and the first path in order, preserves a predetermined length corresponding to the recessed curved surface of the first path, and connects with the water outlet tube with the same end. Accordingly, an easy-to-install faucet structure is obtained.

Comparing with conventional faucets, the present invention is advantageous because (a) the connecting portion extends from the tube base of the inner tube, and the guiding slots are formed at an inner periphery of the tube base of the inner tube, the water inner tubes and water outlet tube can be guided through the guiding slots directly to the second path of the connecting portion when passing through the inner tube without restricting the tube body to achieve the goal of tube connection and simplify installation process; and (b) the connecting portion of the inner tube has partition board at the inner periphery, the extension tube of the water outlet head and the water inner tubes to avoid unintentionally pulling of the water inner tubes, so that the user can smoothly pull out the extension tube without interfering with the water inner tubes that may be loosened if being pulled.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
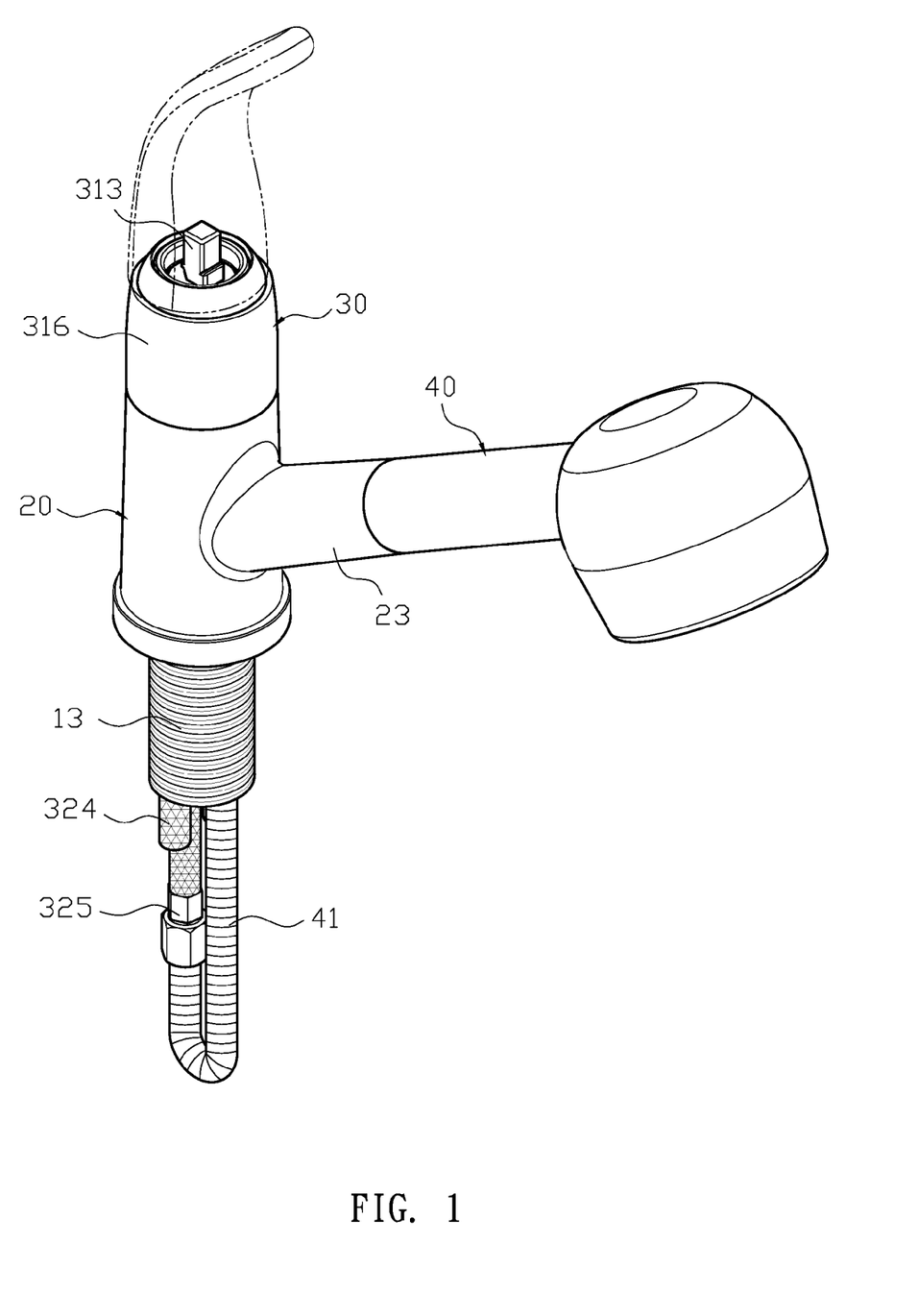
FIG. 1 illustrates a three-dimensional assembled view in the present invention.
Figure 2:
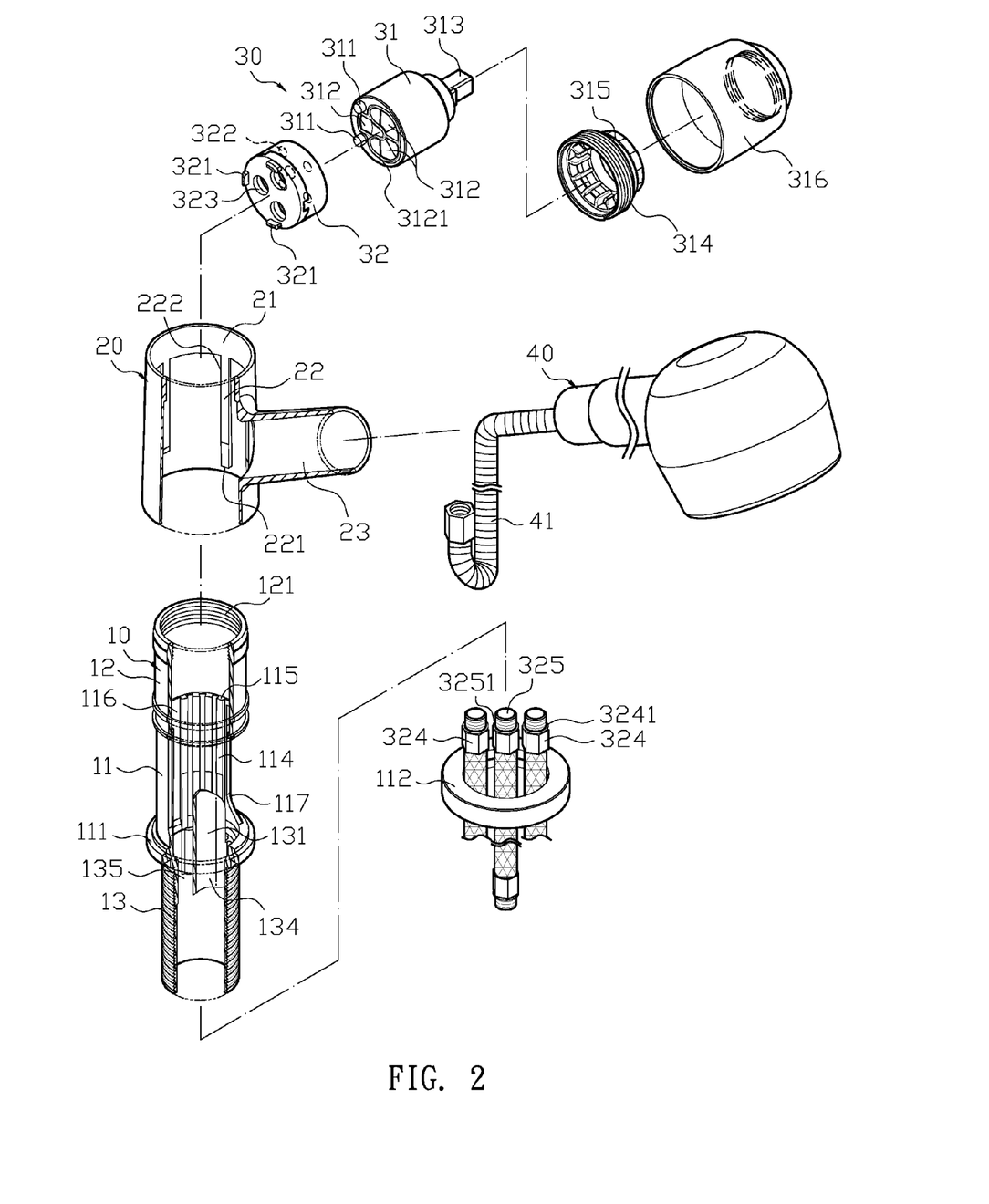
FIG. 2 illustrates a three-dimensional exploded view in the present invention.
Figure 3:
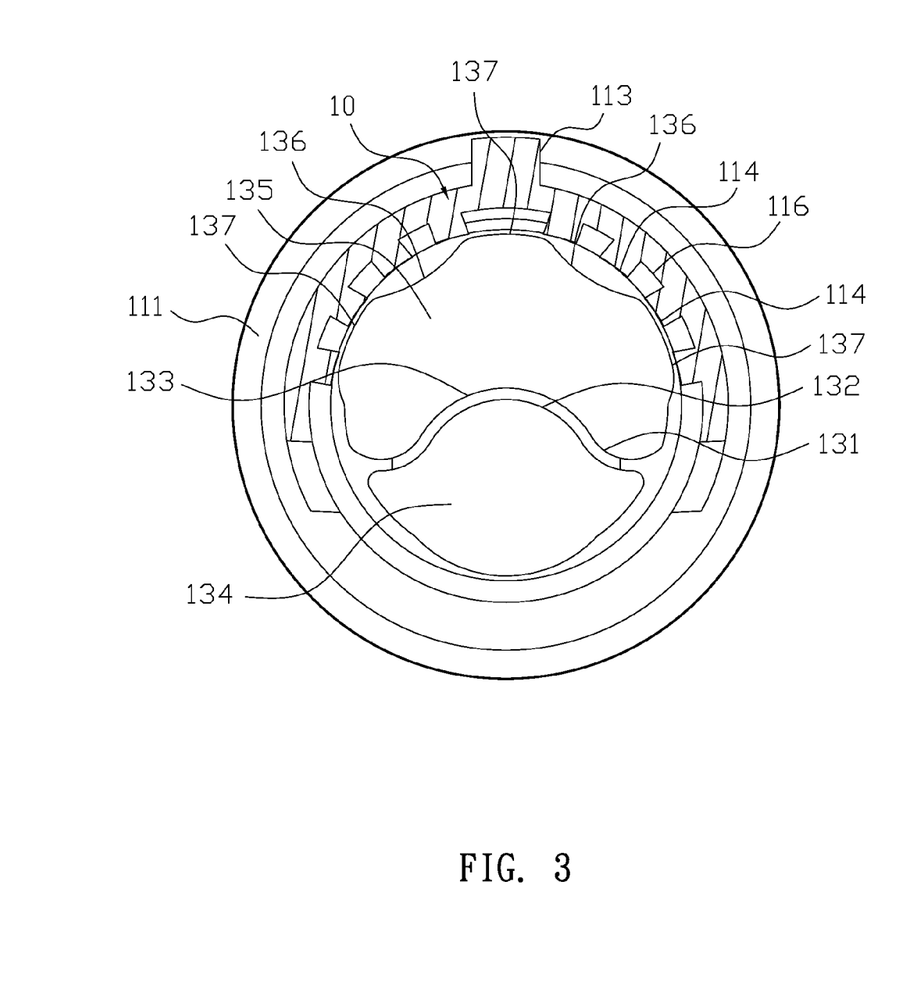
FIG. 3 illustrates a schematic sectional view of the inner tube in the present invention.

In order to further understand the goal, characteristics and effect of the present invention, a number of embodiments along with the drawings are illustrated as following:

Referring to FIGS. 1 to 3, an easy-to-install faucet structure includes an inner tube (10), a main body (20), a water control unit (30) and a water outlet head (40). The inner tube (10) has a tube base (11) that has a stopping edge (111) at an outer periphery, and a circular unit (112) is disposed at a lower portion of the stopping edge (111), and a protruding block (113) is disposed at a rear end of the inner tube (10). A plurality of ribs (114) are formed at an inner periphery of the tube base (11), and a connecting edge (115) is formed at an upper end of each ribs (114), and a plurality of guiding slots (116) are formed between each rib (114). An opening (117) is formed at a front side of the tube base (11), and a receiving tube (12) and a connecting portion (13) extend from both sides of the tube base (11). A locking thread (121) is formed at an opening edge of the receiving tube (12), and a partition board (131) is formed at an inner periphery of the connecting portion (13). A recessed curved surface (132) is formed corresponding to the opening (117) at a front side of the partition board (131), and a corresponding curved surface (133) is formed at a rear side of the partition board (131), so that the connecting portion (13) can be divided into a first path (134) and a second path (135). The second path (135) has a plurality of protruding edges (136) spacedly formed at an inner wall thereof, and a plurality of recessed wedging units (137) are formed between each protruding edge (136). The main body (20) is tubular with a through space (21) disposed outside an outer periphery of the tube base (11) of the inner tube (10). A plurality of rib units (22) are formed at an inner periphery of the through space (21), and a lower portion of the rib unit (22) has a stopping end (221) used to be against the stopping edge (111) of the inner tube (10) to form a stopping positioning. A stopping surface (222) is formed on the side of the rib unit (22), and the stopping surface (22) is provided to restrict the protruding block (113) of the inner tube (10), so that the rotating angle of the main body (20) can be restricted. Also, a branch (23) that is connected with the through space (21) extends from the side of the main body (20). The water control unit (30) includes a water control valve (31) and a fixed base (32), and the water control valve (31) is disposed into the receiving tube (12) of the inner tube (10). Three flow openings (312) and two positioning posts (311) are protrudingly formed at a lower portion of the water control valve (31), and a gasket (3121) is attached to an outer periphery of the flow opening (312). A valve stick (313) is protrudingly formed at an upper portion of the water control valve (31) to control the ratio of water input/output of the flow opening (312) by rotating the valve stick (313). A restricting ring (314) is formed at an outer periphery of the valve stick (313), and the restricting ring (314) is locked through the locking thread (121) of the inner tube (10). A connecting section (315) extends upward from the restricting ring (314), and the connecting section (315) is provided for an outer cover (316) to connect and lock, so as to cover the outer periphery of the receiving tube (12) of the inner tube (10). Also, the opening of the outer cover (316) is used to be against an upper opening of the main body (20). The fixed base (32) is disposed into the receiving tube (12) of the inner tube (10), and the bottom of the fixed base (32) is against the connecting edge (115) of the receiving tube (12) to form a stopping positioning. A plurality of wedging blocks (321) is formed near the bottom of the fixed base (32) to engage with the guiding slot (116) of the connecting edge (115) to form a secured positioning. The fixed base (32) is provided for the water control valve (31) to stack on, and two positioning holes (322) are recessedly formed at an upper portion thereof. The fixed base (32) also has three through holes (323) connecting to a lower surface thereof, and the through holes (323) are provided for the positioning posts (311) of the water control valve (31) to plug in, and the through holes (323) are aligned with the flow openings (312) of the water control valve (31). Two water inner tubes (324) and one water outlet tube (325) are connected to each through hole (323), and a first sealing gasket (3241) and a second sealing gasket (3251) are disposed at a connecting end of the water inner tube (324) and water outlet tube (325) respectively. The water inner tubes (324) and water outlet tube (325) pass through the second path (135), and aligned with each recessed wedging unit (137). The water outlet head (40) plugs into the branch (23) of the main body (20), and an extension tube (41) extends from a rear end of the water output head (40). One end of the extension tube (41) passes the branch (23), opening (117) of the inner tube (10) and the first path (134) in order, preserves a predetermined length corresponding to the recessed curved surface (132) of the first path (134), and connects with the water outlet tube (325) with the same end.

Figure 4:
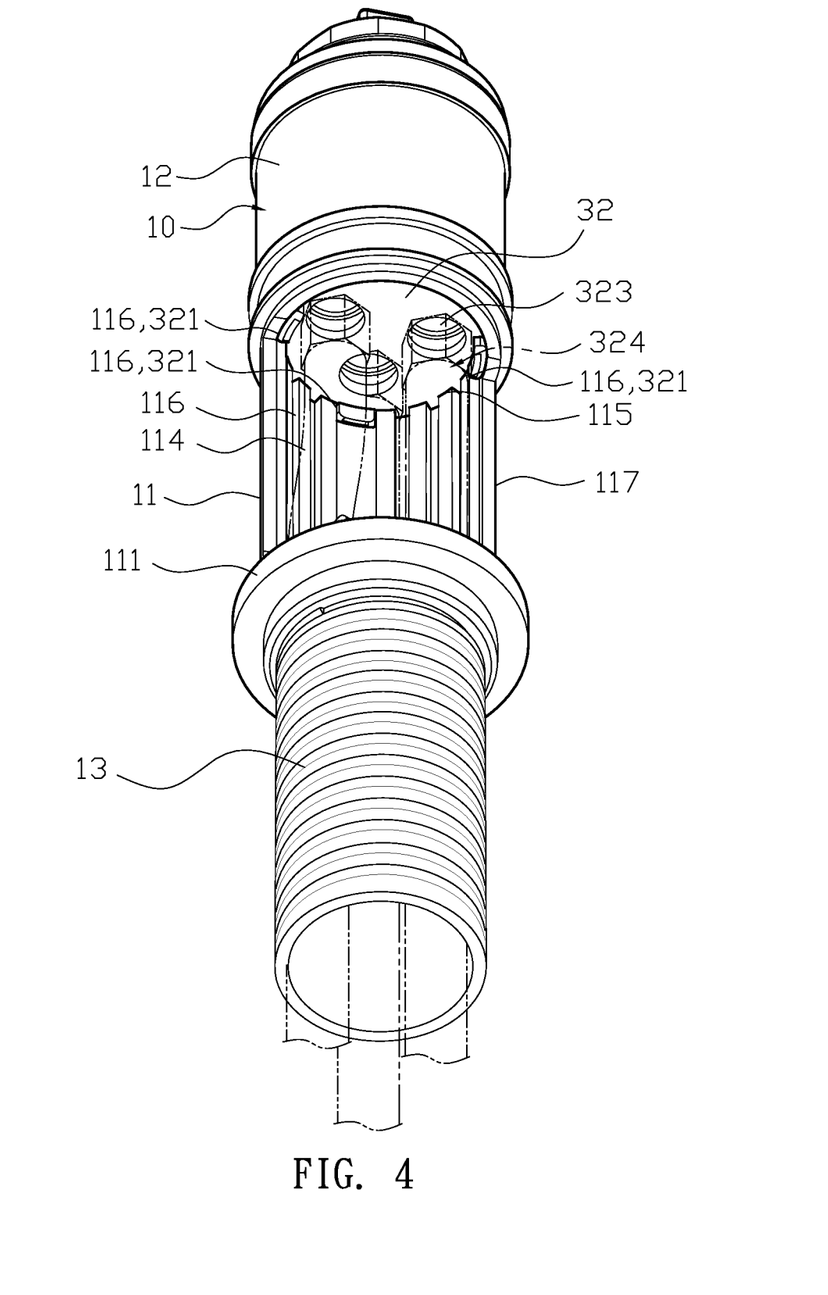
FIG. 4 illustrates a schematic view of assembling the inner tube and water control unit in the present invention.
Figure 6:
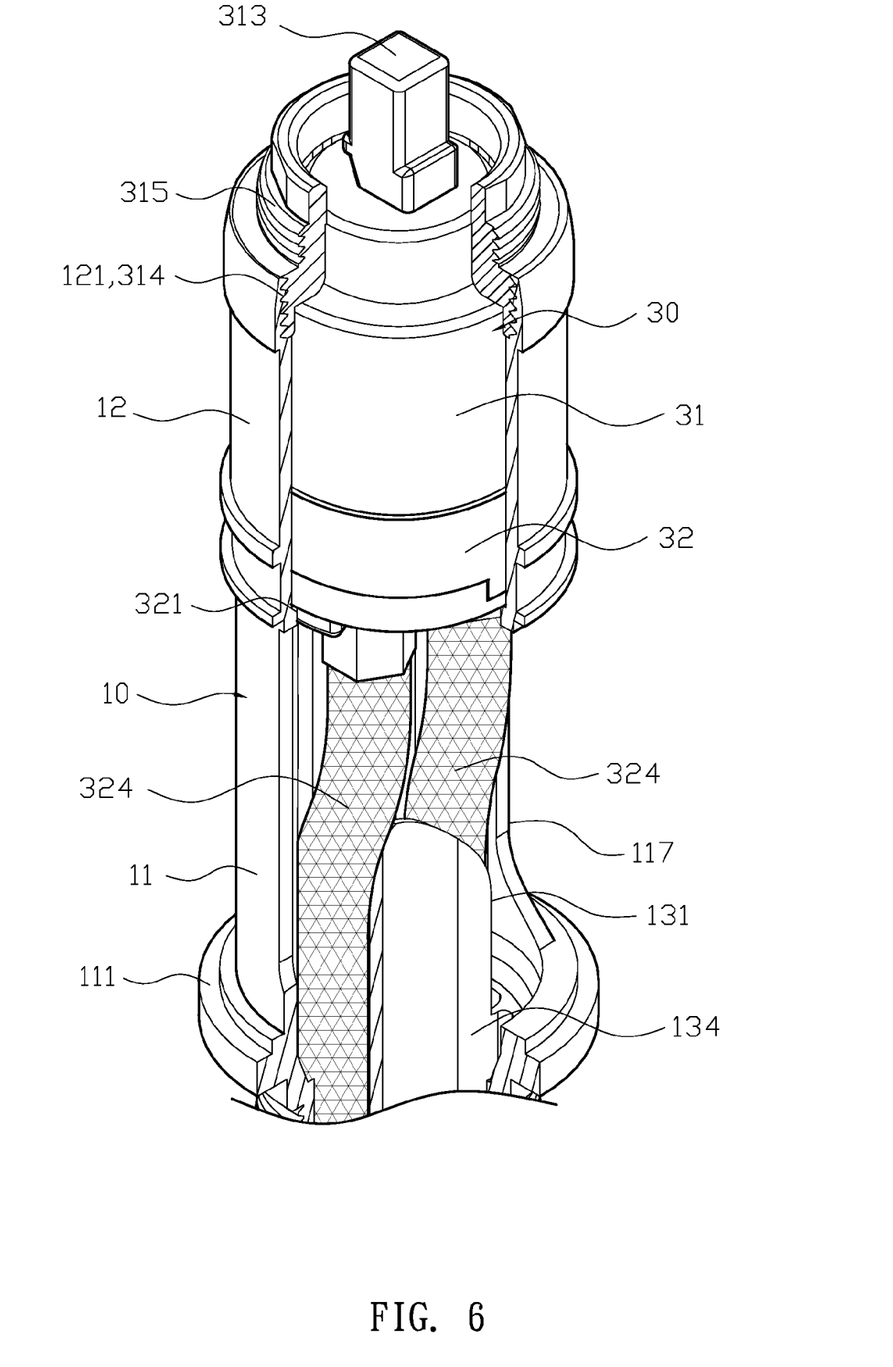
FIG. 6 illustrates a three-dimensional section view of the inner tube and the water control unit in the present invention.
Figure 7:
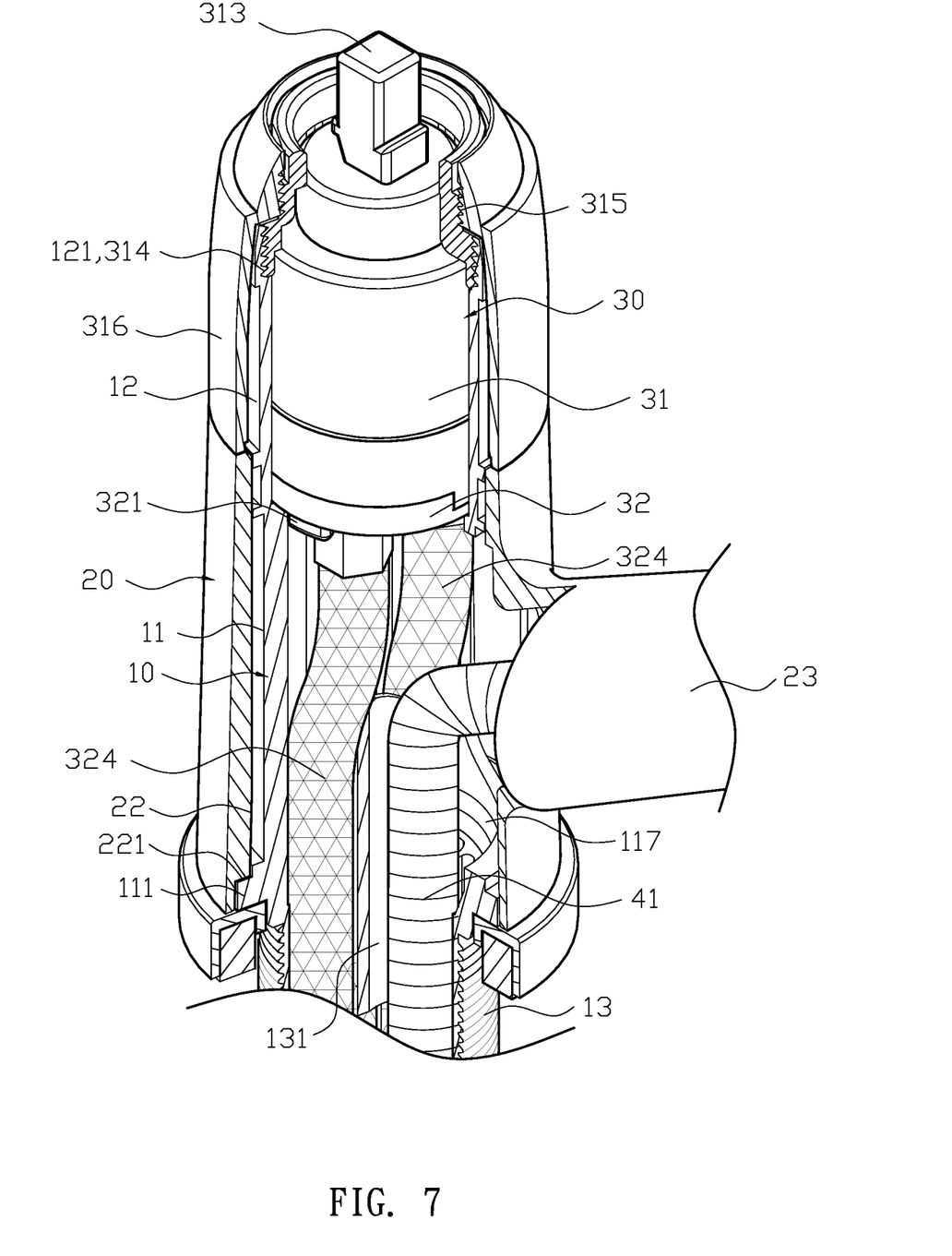
FIG. 7 illustrates a three-dimensional section view of the present invention.
Figure 8:
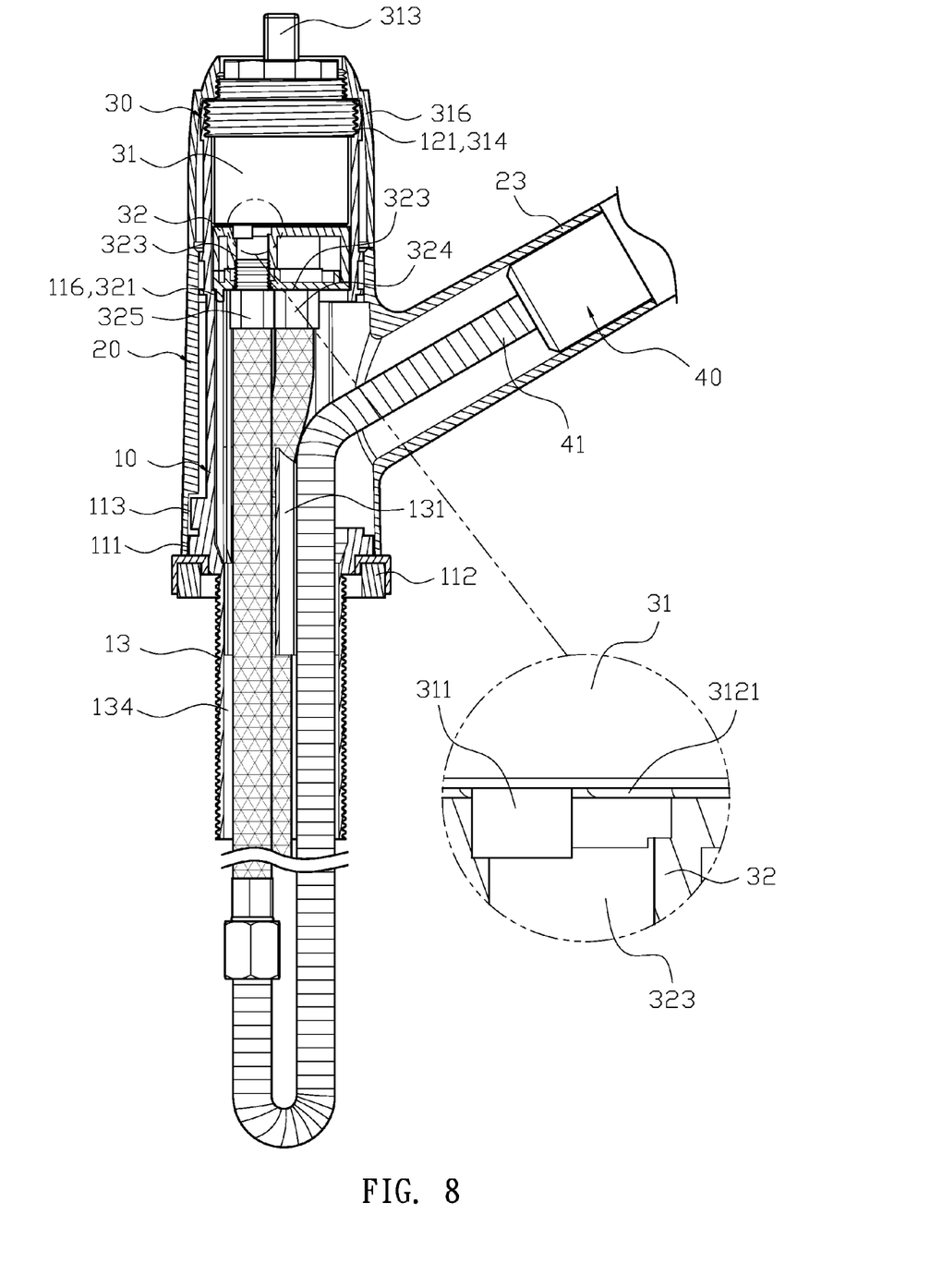
FIG. 8 illustrates a lateral and sectional view of the present invention.

Referring to FIG. 2 for the structure of the present invention, the water inner tubes (324) and water outlet tube (325) are connected with the through holes (323) of the fixed base (32), and the fixed base (32) is disposed into the receiving tube (12) of the inner tube (10), so that the bottom of the fixed base (32) can be against the connecting edge (115) of the tube base (11) to form a stopping positioning. Also, the wedging block (321) of the fixed base (32) engages with the guiding slot (116) of the connecting edge (115) to form a secured positioning (see FIG. 4 as well). At this time, the tube base (11) has a plurality of guiding slots (116) at the inner periphery, so when the water inner tubes (324) and water outlet tube (325) are inserted into the inner tube (10), they can be guided through the guiding slots (116) to pass through the tube base (11) of the inner tube (10) and the connecting portion (13) of the second path (135). At this time, since a plurality of protruding edges (136) are spacedly formed at the inner wall of the second path (135) near the partition board (131), the water inner tubes (324) and water outlet tube (325) can be aligned with the recessed wedging unit (137) of each protruding edge (136) to further separate the water inner tubes (324) and water outlet tube (325) (see FIG. 5 as well). Moreover, the water control valve (31) is fixed on the fixed base (32), and the positioning posts (311) plug into the positioning holes (322) of the fixed base (32). The restricting ring (314) is locked through the locking thread (121) of the receiving tube (12) of the inner tube (10) to force the water control valve (31) to form a restricting positioning (see FIG. 6). The main body (20) is disposed onto the tube base (11) of the inner tube (10) through the through space (21), and the stopping end (221) of the rib unit (22) is against the stopping edge (111) of the tube base (11) to form a stopping positioning to complete the assembly process of the main body (20) and the inner tube (10) (see FIG. 7). The extension tube (41) of the water outlet head (40) passes the branch (23), opening (117) of the inner tube (10) and the first path (134) in order, preserves a predetermined length corresponding to the recessed curved surface (132) of the first path (134), and connects with the water outlet tube (325) with the same end (see FIG. 8) to complete the assembly process. Since the connecting portion (13) extends from the tube base (11) of the inner tube (10), and the guiding slots (116) are formed at an inner periphery of the tube base (11) of the inner tube (10), the water inner tubes (324) and water outlet tube (325) can be guided through the guiding slots (116) directly to the second path (135) of the connecting portion (13) when passing through the inner tube (10) without restricting the tube body to achieve the goal of tube connection and simplify installation process. Furthermore, the second path (135) of the inner tube (10) has a plurality of recessed wedging units (137), and the corresponding curved surface (133) at the rear end of the partition board (131) corresponding to the recessed wedging unit (137), so when the water inner tubes (324) and water outlet tube (325) pass through, they can remain separated and form a secured positioning to further increase the convenience in the assembly process.

Figure 9:
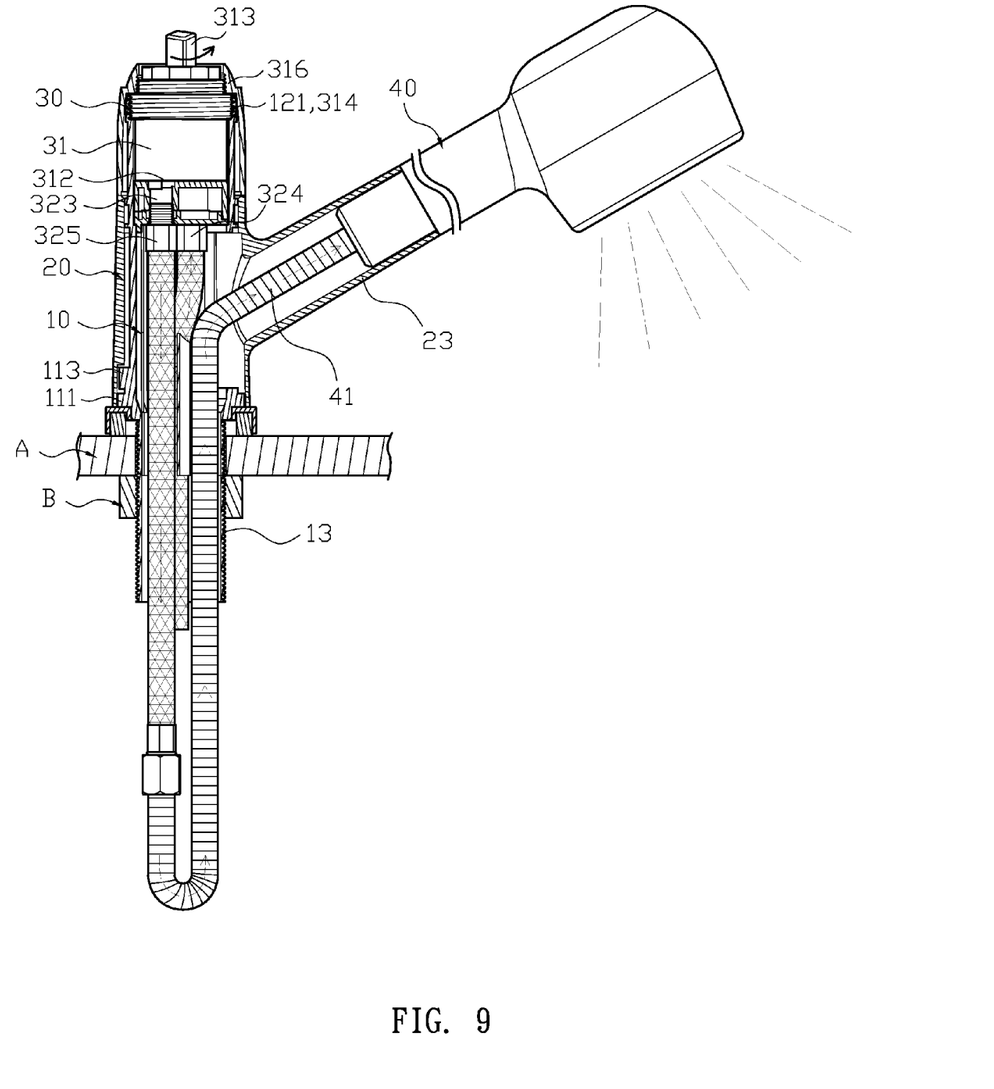
FIG. 9 illustrates a schematic view of the water outlet head outputting water in the present invention.

Referring to FIG. 9 for practical use in the present invention, a faucet can be plugged and connected to a surface (A) of a washbasin through the connecting portion (13), and the stopping edge (111) is against the surface (A) to form a stopping positioning. A penetrating end of the connecting portion (13) is provided for a screw unit (B) to lock, and the water inner tubes (324) of the water control unit (30) are connected to the water source. When a user rotate the valve stick (313) of the water control unit (30) to open up the flow openings (312), the water flows from the through holes (323) of the fixed base (32) of the water control unit (30) to the water control valve (31) to mix, and further to the water outlet tube (325), the extension tube (41) and the water outlet head (40) in order to achieve the goal of water outputting.

Figure 5:
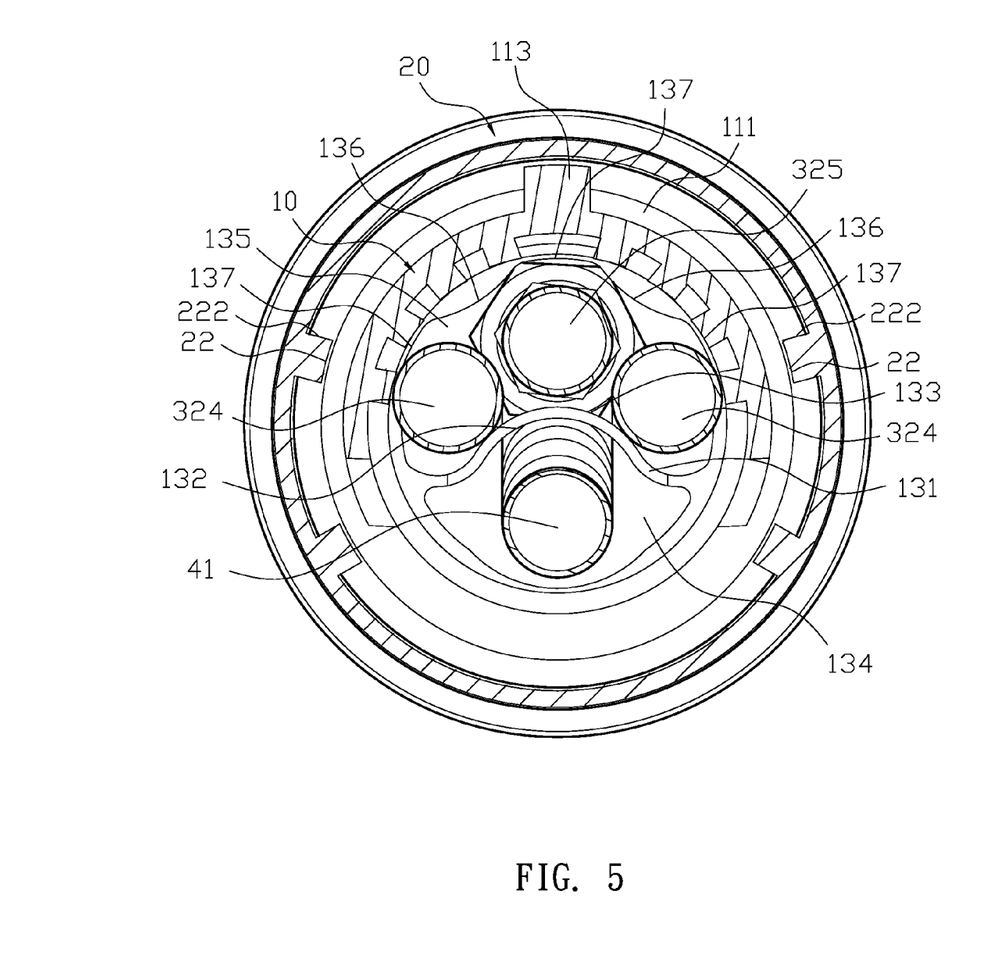
FIG. 5 illustrates a schematic view of using the partition board to separate the water inner tubes, water outlet tube and extension tube in the present invention.
Figure 10:
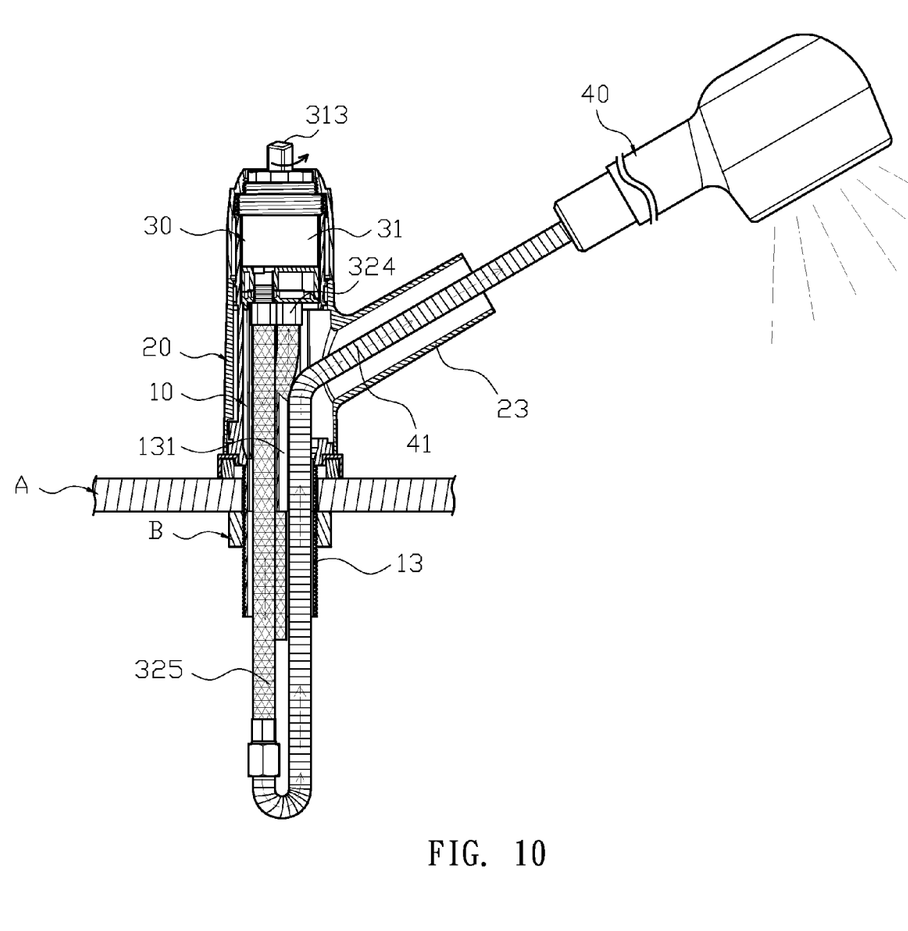
FIG. 10 illustrates a schematic view of the water outlet head that can be pulled out in the present invention.
Figure 11:
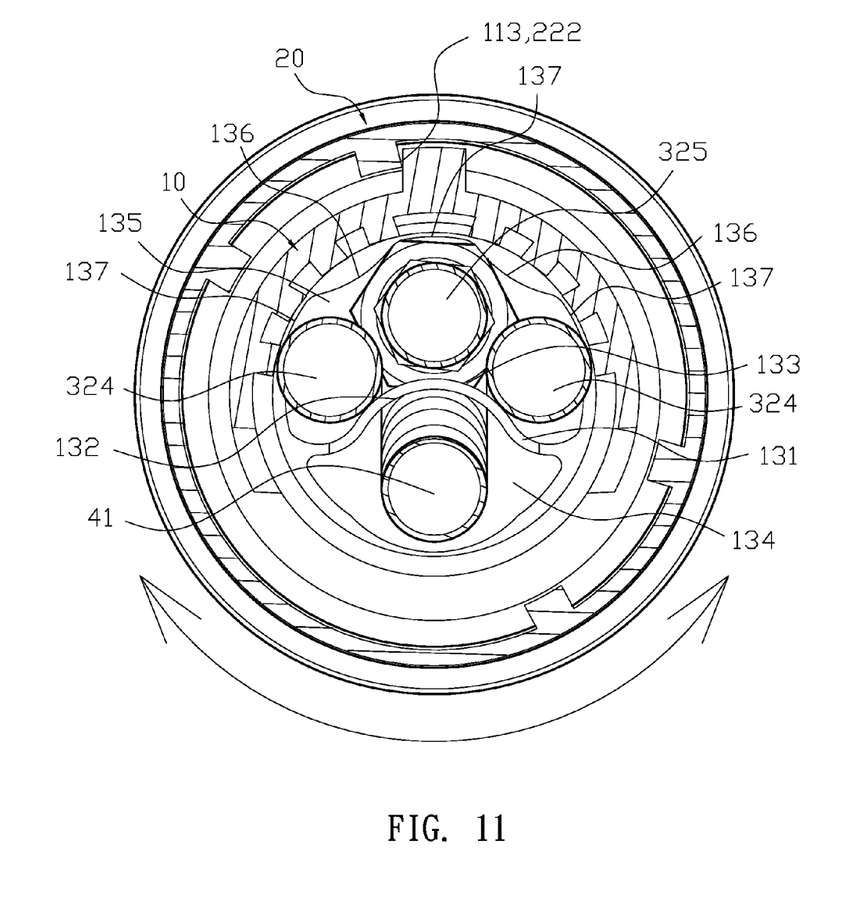
FIG. 11 illustrates a sectional and action view of rotating the main body in the present invention.
Figure 12:
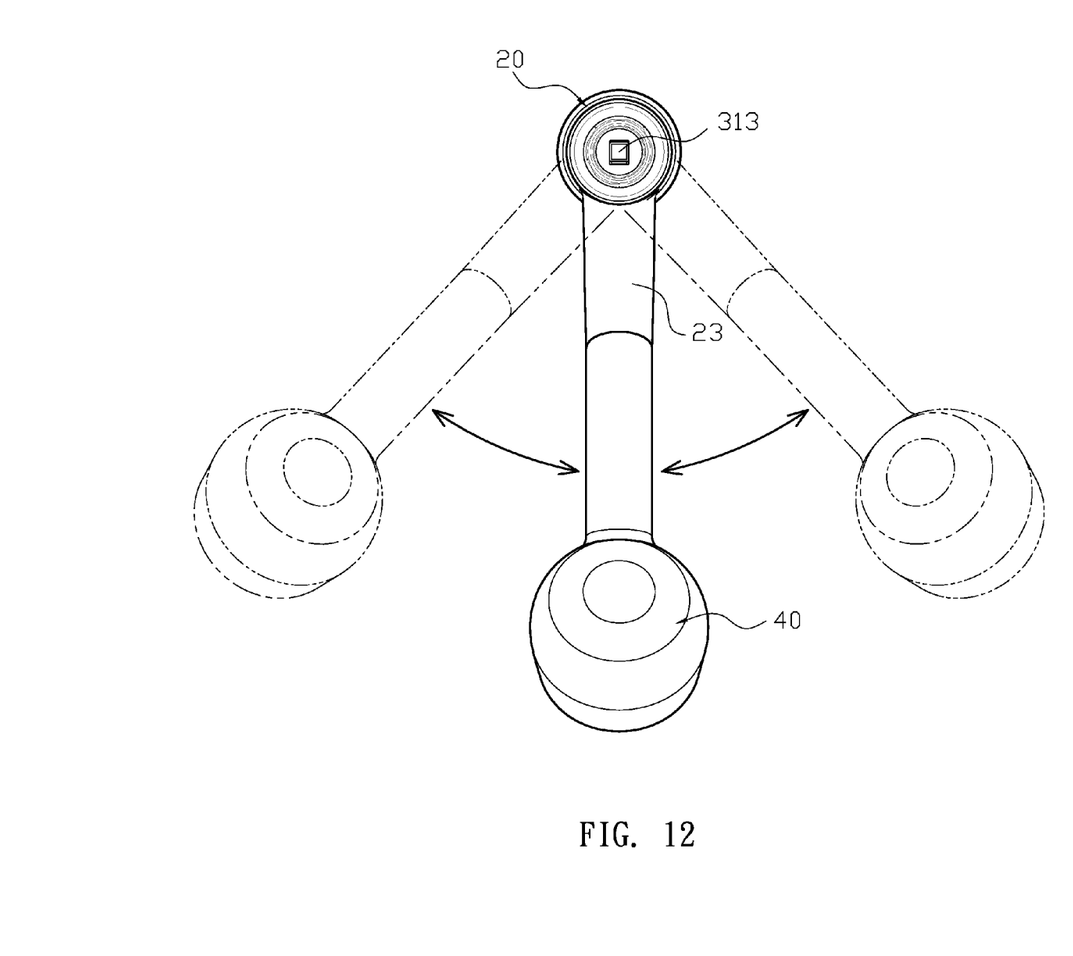
FIG. 12 illustrates a schematic view of rotating the main body in the present invention.

Referring to FIGS. 5 and 10, when the user wants to extend the distance of water output from the faucet, since there is a predetermined length between the extension tube (41) of the water outlet head (40) and the water outlet tube (325), the user is allowed to pull out the water outlet head (40) to achieve the goal of increasing water output distance. At this time, since the connecting portion (13) of the inner tube (10) has partition board (131) at the inner periphery, the extension tube (41) of the water outlet head (40) and the water inner tubes (324) to avoid unintentionally pulling of the water inner tubes (324), so that the user can smoothly pull out the extension tube (41) without interfering with the water inner tubes (324) that may be loosened if being pulled. Furthermore, the partition board (131) has the recessed curved surface (132) corresponding to the extension tube (41) to prevent the extension tube (41) from sliding, to further increase the smoothness when the extension tube (41) is pulled out. Referring to FIGS. 11 and 12, when the user wants to adjust the position of the water outlet head (40) of the faucet, the main body (20) rotates along the inner tube (10) as an axis. Also, when the main body (20) rotates, the stopping surface (222) is against the protruding block (113) of the inner tube (10) to form a stopping positioning. so that the user can adjust the position of the water outlet head according to his/her preferences to further increase the flexibility when using the faucet.

According to the embodiments discussed above, the present invention has the following advantages: (a) the connecting portion (13) extends from the tube base (11) of the inner tube (10), and the guiding slots (116) are formed at an inner periphery of the tube base (11) of the inner tube (10), the water inner tubes (324) and water outlet tube (325) can be guided through the guiding slots (116) directly to the second path (135) of the connecting portion (13) when passing through the inner tube (10) without restricting the tube body to achieve the goal of tube connection and simplify installation process; and (b) the connecting portion (13) of the inner tube (10) has partition board (131) at the inner periphery, the extension tube (41) of the water outlet head (40) and the water inner tubes (324) to avoid unintentionally pulling of the water inner tubes (324), so that the user can smoothly pull out the extension tube (41) without interfering with the water inner tubes (324) that may be loosened if being pulled.

Having described the invention by the description and illustrations above, it should be understood that these are exemplary of the invention and are not to be considered as limiting. Accordingly, the invention is not to be considered as limited by the foregoing description, but includes any equivalent

What is claimed is:

1. A faucet structure, comprising:
    an inner tube, having a tube base that has a stopping edge at an outer periphery, and a plurality of ribs formed at an inner periphery of the tube base, wherein a connecting edge is formed at an upper end of each rib, and a plurality of guiding slots are formed between each rib, and an opening is formed at a front side of the tube base, wherein a receiving tube and a connecting portion extend from both sides of the tube base, and a locking thread is formed at an opening edge of the receiving tube, and a partition board that is formed at an inner periphery of the connecting portion is divided into a first path and a second path;
    a main body that is tubular with a through space disposed outside an outer periphery of the tube base of the inner tube, and a plurality of rib units formed at an inner periphery of the through space, and a lower portion of the rib unit having a stopping end used to be against the stopping edge of the inner tube to form a stopping positioning, wherein a branch that is connected with the through space extends from sideway of the main body;
    a water control unit having a water control valve and a fixed base, wherein the water control valve is disposed into the receiving tube of the inner tube, and three flow openings and two positioning posts are protrudingly formed at a lower portion of the water control valve, and a valve stick is protrudingly formed at an upper portion of the water control valve, wherein a restricting ring is formed at an outer periphery of the valve stick, and the restricting ring is locked through the locking thread of the inner tube, wherein a connecting section extends upward from the restricting ring, and the connecting section is provided for an outer cover to connect and lock, so as to cover an outer periphery of the receiving tube of the inner tube, wherein the opening of the outer cover is against an upper opening of the main body, and the fixed base is disposed into the receiving tube of the inner tube, and the bottom of the fixed base is against the connecting edge of the receiving tube to form a stopping positioning, wherein the fixed base is provided for the water control valve to stack on, and two positioning holes are recessedly formed at an upper portion thereof, wherein the fixed base has three through holes connecting to a lower surface thereof, and the through holes are provided for the positioning posts of the water control valve to plug in, and aligned with the flow openings of the water control valve, wherein two water inner tubes and one water outlet tube are connected to each through hole, and pass through the second path of the inner tube; and
    a water outlet head plugging into the branch of the main body, and an extension tube extending from a rear end of the water output head, wherein one end of the extension tube passes the branch, opening of the inner tube and the first path in order, preserves a predetermined length corresponding to the recessed curved surface of the first path, and connects with the water outlet tube with the predetermined length, wherein a protruding block is formed at a rear end of the inner tube, and a stopping surface formed at sideway of the rib unit of the main body is provided for the protruding block to form a stop.

2. The faucet structure of claim 1, wherein a recessed curved surface is formed corresponding to the opening at a front side of the partition board of the inner tube, and the extension tube of the water outlet head is aligned with the recessed curved surface.

3. A faucet structure, comprising:
    an inner tube, having a tube base that has a stopping edge at an outer periphery, and a plurality of ribs formed at an inner periphery of the tube base, wherein a connecting edge is formed at an upper end of each rib, and a plurality of guiding slots are formed between each rib, and an opening is formed at a front side of the tube base, wherein a receiving tube and a connecting portion extend from both sides of the tube base, and a locking thread is formed at an opening edge of the receiving tube, and a partition board that is formed at an inner periphery of the connecting portion is divided into a first path and a second path;
    a main body that is tubular with a through space disposed outside an outer periphery of the tube base of the inner tube, and a plurality of rib units formed at an inner periphery of the through space, and a lower portion of the rib unit having a stopping end used to be against the stopping edge of the inner tube to form a stopping positioning, wherein a branch that is connected with the through space extends from sideway of the main body;
    a water control unit having a water control valve and a fixed base, wherein the water control valve is disposed into the receiving tube of the inner tube, and three flow openings and two positioning posts are protrudingly formed at a lower portion of the water control valve, and a valve stick is protrudingly formed at an upper portion of the water control valve, wherein a restricting ring is formed at an outer periphery of the valve stick, and the restricting ring is locked through the locking thread of the inner tube, wherein a connecting section extends upward from the restricting ring, and the connecting section is provided for an outer cover to connect and lock, so as to cover an outer periphery of the receiving tube of the inner tube, wherein the opening of the outer cover is against an upper opening of the main body, and the fixed base is disposed into the receiving tube of the inner tube, and the bottom of the fixed base is against the connecting edge of the receiving tube to form a stopping positioning, wherein the fixed base is provided for the water control valve to stack on, and two positioning holes are recessedly formed at an upper portion thereof, wherein the fixed base has three through holes connecting to a lower surface thereof, and the through holes are provided for the positioning posts of the water control valve to plug in, and aligned with the flow openings of the water control valve, wherein two water inner tubes and one water outlet tube are connected to each through hole, and pass through the second path of the inner tube; and
    a water outlet head plugging into the branch of the main body, and an extension tube extending from a rear end of the water output head, wherein one end of the extension tube passes the branch, opening of the inner tube and the first path in order, preserves a predetermined length corresponding to the recessed curved surface of the first path, and connects with the water outlet tube with the predetermined length, wherein a corresponding curved surface is formed at a rear side of the partition board, and the second path has a plurality of protruding edges spacedly formed at an inner wall of the second path, and a plurality of recessed wedging units are formed between each protruding edge, so that the water inner tubes and water outlet tube are aligned with each recessed wedging unit.

4. The faucet structure of claim 3, wherein a recessed curved surface is formed corresponding to the opening at a front side of the partition board of the inner tube, and the extension tube of the water outlet head is aligned with the recessed curved surface.

5. The faucet structure of claim 3, wherein a protruding block is formed at a rear end of the inner tube, and a stopping surface formed at sideway of the rib unit of the main body is provided for the protruding block to form a stop.

\* \* \* \* \*